US010801651B2

(12) United States Patent
Olsen et al.

(10) Patent No.: US 10,801,651 B2
(45) Date of Patent: Oct. 13, 2020

(54) ULTRAHIGH PRESSURE FITTING WITH RECESSED SEALING SURFACE AND RELATED TECHNOLOGY

(71) Applicant: OMAX Corporation, Kent, WA (US)

(72) Inventors: John H. Olsen, Vashon, WA (US); Darren Stang, Covington, WA (US)

(73) Assignee: OMAX Corporation, Kent, WA (US)

( * ) Notice: Subject to any disclaimer, the term of this patent is extended or adjusted under 35 U.S.C. 154(b) by 422 days.

(21) Appl. No.: 15/898,110

(22) Filed: Feb. 15, 2018

(65) Prior Publication Data

US 2019/0249805 A1 Aug. 15, 2019

(51) Int. Cl.
| | | |
|---|---|---|
| *B24C 7/00* | (2006.01) | |
| *F16L 19/02* | (2006.01) | |
| *B24C 5/02* | (2006.01) | |
| *F16L 15/00* | (2006.01) | |
| *F16L 41/02* | (2006.01) | |

(52) U.S. Cl.
CPC ............ *F16L 19/0206* (2013.01); *B24C 5/02* (2013.01); *B24C 7/0007* (2013.01); *F16L 19/0225* (2013.01); *F16L 15/006* (2013.01); *F16L 41/021* (2013.01)

(58) Field of Classification Search
CPC ...... B24C 5/02; B24C 7/0007; F16L 19/0206; F16L 19/0225; F16L 15/006; H02G 3/06
USPC ....... 451/99; 285/129.1, 129.2, 133.4, 143.1, 285/179.1, 180
See application file for complete search history.

(56) References Cited

U.S. PATENT DOCUMENTS

| | | | | |
|---|---|---|---|---|
| 1,847,147 A | * | 3/1932 | Thomas, Jr. ............. | H02G 3/06 285/179.1 |
| 2,528,280 A | * | 10/1950 | Lyon ...................... | F16L 15/00 29/890.14 |
| 3,517,701 A | | 6/1970 | Smith | |
| 3,711,633 A | * | 1/1973 | Ghirardi .................. | H02G 3/06 174/135 |
| 4,339,897 A | * | 7/1982 | Thompson ............ | B24C 7/0046 137/595 |
| 5,255,853 A | * | 10/1993 | Munoz .................... | B08B 3/024 239/433 |
| 5,794,858 A | * | 8/1998 | Munoz ..................... | B24C 5/04 239/433 |

(Continued)

FOREIGN PATENT DOCUMENTS

CN 202955386 U 5/2013

*Primary Examiner* — George B Nguyen
(74) *Attorney, Agent, or Firm* — Perkins Coie LLP (57) ABSTRACT

A waterjet system in accordance with at least some embodiments of the present technology includes a tube configured to carry ultrahigh pressure liquid, and a fitting connected to an end portion of the tube. The fitting includes a body and a clamping block that secures the tube to the body. The body includes a recess, a passage extending inwardly from the recess, a sealing surface extending around the passage, and a sidewall extending around the sealing surface. The sealing surface meets the sidewall at an annular corner within the recess. The clamping block includes first, second, and third through holes spaced apart from one another. The tube extends through the first through hole and is secured to the clamping block via a threaded connection. First and second clamping bolts extend through the first and second through holes, respectively, and into respective threaded openings in the body.

20 Claims, 8 Drawing Sheets

(56) References Cited

U.S. PATENT DOCUMENTS

| | | |
|---|---|---|
| 9,272,437 B2 | 3/2016 | Hashish et al. |
| 9,884,406 B2 * | 2/2018 | Hashish ................ B24C 7/0076 |
| 2011/0084476 A1 | 4/2011 | Nishida |
| 2012/0247296 A1 * | 10/2012 | Stang ........................ B26F 1/26 83/177 |
| 2014/0015245 A1 * | 1/2014 | Chiu ........................ H02G 3/06 285/133.11 |

* cited by examiner

ULTRAHIGH PRESSURE FITTING WITH RECESSED SEALING SURFACE AND RELATED TECHNOLOGY

TECHNICAL FIELD

The present technology is related to ultrahigh pressure plumbing, such as ultrahigh pressure plumbing used in waterjet systems.

INCORPORATION BY REFERENCE

U.S. Pat. No. 3,362,731, filed on Nov. 22, 1965, and titled High Pressure Fitting is incorporated herein by reference in its entirety. To the extent the foregoing patent or any other material incorporated herein by reference conflicts with the present disclosure, the present disclosure controls.

BACKGROUND

Waterjet systems are used in precision cutting, shaping, carving, reaming, and other material processing applications. During operation of a waterjet system, a cutting head directs a high-velocity jet of liquid carrying particles of abrasive material toward a workpiece to rapidly erode portions of the workpiece. Waterjet processing has significant advantages over other material processing technologies (e.g., grinding, plasma-cutting, etc.). For example, waterjet systems tend produce relatively fine and clean cuts without heat-affected zones around the cuts. Waterjet systems also tend to be highly versatile with respect to the material type of the workpiece. The range of materials that can be processed using waterjet systems includes very soft materials (e.g., rubber, foam, leather, and paper) as well as very hard materials (e.g., stone, ceramic, and hardened metal). Furthermore, in many cases, waterjet systems are capable of executing demanding material processing operations while generating little or no dust, smoke, or other potentially toxic airborne byproducts.

BRIEF DESCRIPTION OF DRAWINGS

Many aspects of the present technology can be better understood with reference to the following drawings. The components in the drawings are not necessarily to scale. Instead, emphasis is placed on clearly illustrating the principles of the present technology. For ease of reference, the same reference number may be used throughout this disclosure to identify identical or analogous components or features.

DETAILED DESCRIPTION

A waterjet system typically includes a pressurizing device (e.g., a pump) capable of pressurizing liquid to an ultrahigh pressure (e.g., a pressure of 5,000 psi or greater), and a cutting head that receives the pressurized liquid via a conveyance. During a cutting process performed on a stationary workpiece, the pressurizing device typically remains stationary whereas the cutting head moves relative to the workpiece and relative to the pressurizing device. Maintaining a reliable plumbing connection between the pressurizing device and the cutting head during this relative movement can be technically challenging. In some cases, the conveyance between the pressurizing device and the cutting head includes tube segments and one or more intermediate fittings coupling the tube segments to one another. The conveyance can also include a first end fitting coupling the tube segments to the pressurizing device, and a second end fitting coupling the tube segments to the cutting head. In other cases, the conveyance may include a single tube segment with no intermediate fittings, but with the first end fitting coupling the tube segment to the pressurizing device and/or the second end fitting coupling the tube segment to the cutting head. When present, an intermediate fitting can facilitate routing the conveyance along a non-linear path between the pressurizing device and the cutting head.

Naturally, any connection at which two liquid-carrying parts meet may leak if not adequately sealed. Creating an adequate seal is particularly challenging in the context of plumbing configured to carry ultrahigh pressure liquid, such as the conveyance between the pressurizing device and the cutting head in a waterjet system. Part-to-part connections in ultrahigh pressure plumbing typically include a metal-to-metal interface subject to very high static pressure. In a conventional fitting rated for ultrahigh pressure, the metal-to-metal interface is conical with an angle of about 30 degrees relative to the cone axis. Static pressure is applied via a collar, a collet, and a gland nut. Examples of this type of collet fitting can be found in U.S. Pat. No. 3,362,731, which is incorporated herein by reference in its entirety. Although widely used, collet fittings have many disadvantages. For example, collet fittings tend to be expensive to manufacture because they incorporate numerous precisely machined parts. Collet fittings also tend to be difficult to install because they are easily misaligned and/or over-tightened. Torqueing of the fitting can cause twist within the tube. Over-tightening, for example, can cause the end of a tube to spall or otherwise deform in a manner that interferes with the integrity of the seal. Further, over-tightening can close the end of the tube fitting causing unwanted pressure drops. This occurs with ¼" tube and even more severely with 3/16" tube, both of which are commonly used to carry ultrahigh pressure liquid in waterjet systems. Finally, the shape of the metal-to-metal interface in collet fittings tends to cause relatively high tangential stress on the female part, which tends to reduce the fatigue life of collet fittings.

Fittings in accordance with at least some embodiments of the present technology mitigate the disadvantages of conventional collet fittings and/or offer other advantages over conventional technologies. For example, a fitting in accordance with at least some embodiments of the present technology includes a sealing interface that is more shallow than the sealing interface of a conventional collet fitting. Due to this difference and/or for other reasons, the fitting may be less prone to misalignment and/or over-tightening than a conventional collet fitting. In addition or alternatively, the shallow sealing interface can reduce tangential stress on the female part, thereby improving the fatigue life of the fitting. Furthermore, fittings in accordance with at least some embodiments of the present technology are configured to diffuse the energy of any leakage from the sealing interface.

Specific details of fittings and related devices, systems, and methods in accordance with several embodiments of the present technology are disclosed herein with reference to FIGS. 1-11. Although the systems, devices, and methods may be disclosed herein primarily or entirely with respect to waterjet applications, other applications in addition to those disclosed herein are within the scope of the present technology. For example, fittings and related devices, systems, and methods in accordance with at least some embodiments of the present technology can be advantageously used in hydraulic drive systems, pressure washers, and fire-suppression systems, among other examples of systems that use ultrahigh pressure liquids. Furthermore, it should be understood, in general, that other systems, devices, and methods in addition to those disclosed herein are within the scope of the present technology. For example, systems, devices, and methods in accordance with embodiments of the present technology can have different and/or additional configurations, components, and procedures than those disclosed herein. Moreover, a person of ordinary skill in the art will understand that systems, devices, and methods in accordance with embodiments of the present technology can be without one or more of the configurations, components, and/or procedures disclosed herein without deviating from the present technology. Waterjet systems in accordance with embodiments of the present technology can be used with a variety of suitable fluids, such as water, aqueous solutions, hydrocarbons, glycols, and nitrogen. As such, although the term "waterjet" is used herein for ease of reference, unless the context clearly indicates otherwise, the term refers to a jet formed by any suitable fluid, and is not limited exclusively to water or aqueous solutions.

Figure 1:
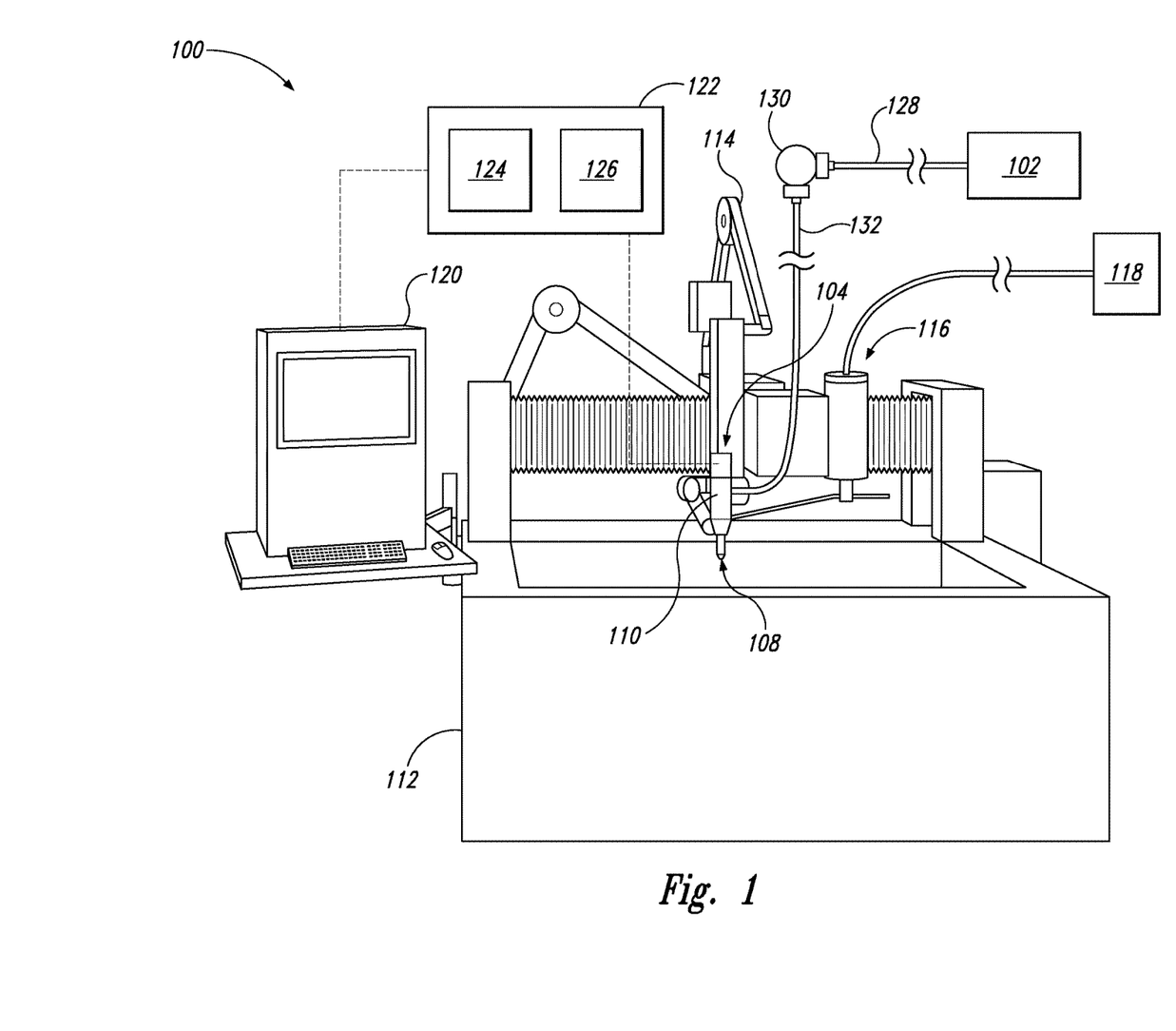
FIG. 1 is a perspective view of a waterjet system in accordance with at least some embodiments of the present technology.

FIG. 1 is a perspective view illustrating a waterjet system 100 in accordance with at least some embodiments of the present technology. The waterjet system 100 can include a pressurizing device 102 (e.g., a pump) configured to pressurize a liquid to a pressure suitable for waterjet processing. In some cases, this is a pressure of at least 10,000 psi (e.g., a pressure within a range from 10,000 psi to 120,000 psi). In other cases, the pressurizing device 102 may be configured to pressurize liquid to a lower maximum pressure (e.g., a pressure within a range from 5,000 psi to 10,000 psi). The waterjet system 100 can further include a cutting head 104 configured to receive liquid from the pressurizing device 102 and to direct a jet including the liquid toward a workpiece (not shown). The cutting head 104 can include a jet outlet 108 and a shutoff valve 110 upstream from the jet outlet 108. The waterjet system 100 can also include a catcher 112 and an actuator 114 configured to move the cutting head 104 relative to the catcher 112, relative to the pressurizing device 102, and relative to other stationary components of the waterjet system 100. For example, the actuator 114 can be configured to move the cutting head 104 along a predetermined path in two or three dimensions and to tilt the cutting head 104 while directing the jet toward the workpiece.

The waterjet system 100 can further include an abrasive-delivery apparatus 116 configured to feed particulate abrasive material from an abrasive material source 118 to the cutting head 104. Within the cutting head 104, the particulate abrasive material can accelerate with the jet before being directed toward the workpiece. In some embodiments, the abrasive-delivery apparatus 116 is configured to move with the cutting head 104 relative to stationary components of the waterjet system 100. In other embodiments, the abrasive-delivery apparatus 116 can be configured to be stationary while the cutting head 104 moves relative to stationary components of the waterjet system 100. With reference again to FIG. 1, the catcher 112 can be configured to hold a pool of liquid positioned to diffuse kinetic energy of the jet after the jet passes through the workpiece. The waterjet system 100 can also include a user interface 120 and a controller 122 (shown schematically) operably connected to the user interface 120 and to the actuator 114. The controller 122 can include a processor 124 and memory 126 and can be programmed with instructions (e.g., non-transitory instructions contained on a computer-readable medium) that, when executed, control operation of the waterjet system 100.

The waterjet system 100 can further include a first tube 128, a fitting 130, and a second tube 132 in series downstream from the pressurizing device 102 and upstream from the cutting head 104. The first tube 128, the fitting 130, and the second tube 132 can be configured to carry ultrahigh pressure liquid from the pressurizing device 102 to the cutting head 104 along a nonlinear path. For example, the fitting 130 can be at respective end portions of the first tube 128 and the second tube 132, and can fluidly connect the first tube 128 and the second tube 132 to one another at a suitable angle. The first tube 128, the second tube 132, or both can be sufficiently flexible to allow the cutting head 104 to move within a suitable range of motion relative to the pressurizing device 102. In addition or alternatively, the waterjet system 100 can include a movable joint (not shown) between the pressurizing device 102 and the cutting head 104. In at least some cases, the overall connection between the pressurizing device 102 and the cutting head 104, and, individually, the first tube 128, the fitting 130, and the second tube 132 have respective pressure ratings of at least 10,000 psi (e.g., respective pressure ratings within a range from 10,000 psi to 150,000 psi).

Figure 2:
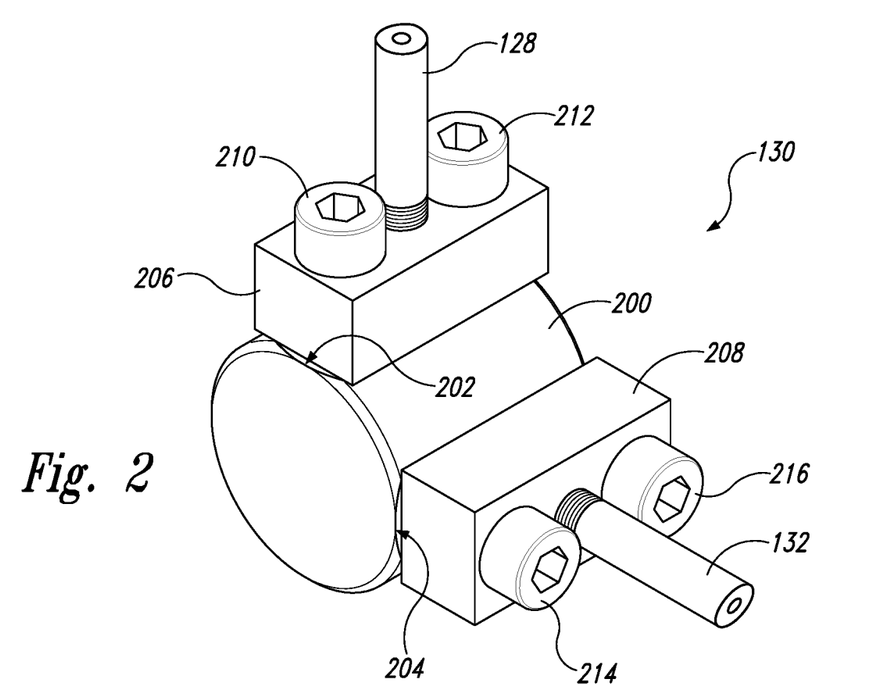
FIG. 2 is a perspective view of a fitting and associated components of the waterjet system shown in FIG. 1.
Figure 3:
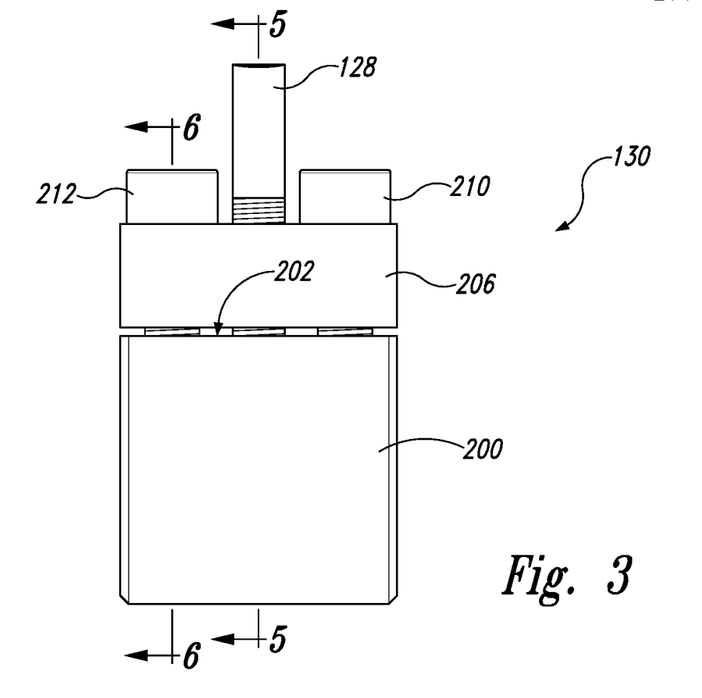
FIG. 3 is a front profile view of the fitting and associated components of the waterjet system shown in FIG. 1.

FIGS. 2 and 3 are, respectively, a perspective view and a front profile view of the fitting 130, an adjacent end portion of the first tube 128, and an adjacent end portion of the second tube 132. The fitting 130 can include a body 200 having an outer surface with a first flat region 202 and a second flat region 204 circumferentially spaced apart from the first flat region 202. The fitting 130 can further include a first clamping block 206 at the first flat region 202, and a second clamping block 208 at the second flat region 204. In some embodiments, the body 200 is cylindrical and the first clamping block 206 and the second clamping block 208 are rectangular solids. In other embodiments, these components of the fitting 130 can have other suitable shapes. With reference again to FIGS. 2 and 3, the fitting 130 can also include a first clamping bolt 210 and a second clamping bolt 212 at opposite sides of the end portion of the first tube 128. Similarly, the fitting 130 can include a third clamping bolt 214 and a fourth clamping bolt 216 at opposite sides of the end portion of the second tube 132.

Figure 4:
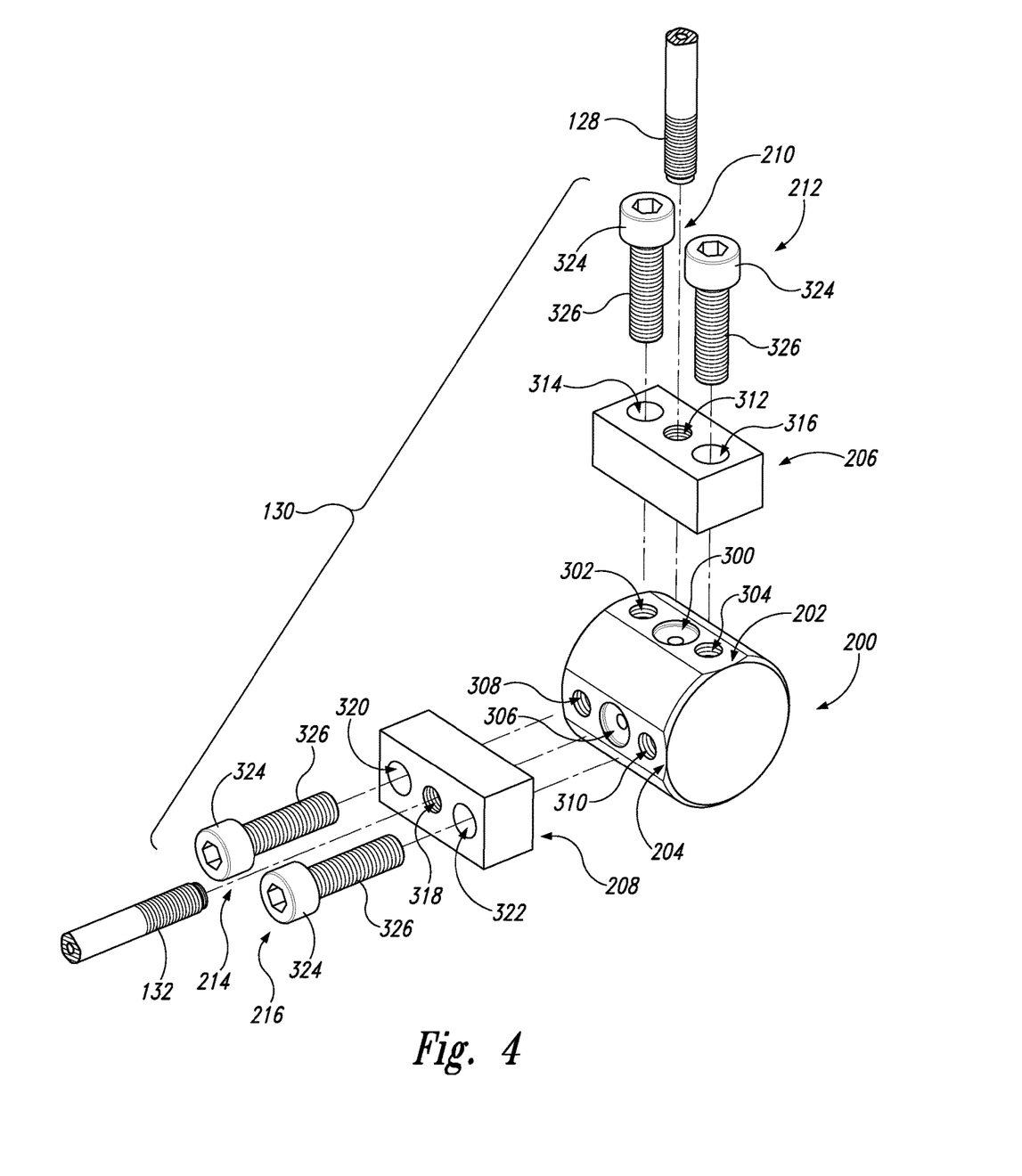
FIG. 4 is an exploded perspective view of the fitting and associated components of the waterjet system shown in FIG. 1.

FIG. 4 is an exploded perspective view of the fitting 130, the adjacent end portion of the first tube 128, and the adjacent end portion of the second tube 132. As shown in FIG. 4, the body 200 can include a first recess 300 at the first flat region 202, a first opening 302 laterally spaced apart from the first recess 300, and a second opening 304 also laterally spaced apart from the first recess 300. The first opening 302 and the second opening 304 can be laterally spaced apart from the first recess 300 in opposite respective directions such that the first recess 300 is centrally positioned therebetween. The first flat region 202 can extend around respective outermost portions of the first recess 300, the first opening 302, and the second opening 304. The body 200 can also include a second recess 306 circumferentially spaced apart from the first recess 300, a third opening 308 laterally spaced apart from the second recess 306, and a fourth opening 310 also laterally spaced apart from the second recess 306. The third opening 308 and the fourth opening 310 can be laterally spaced apart from the second recess 306 in opposite respective directions such that the second recess 306 is centrally positioned between the third opening 308 and the fourth opening 310. The second flat region 204 can extend around respective outermost portions of the second recess 306, the third opening 308, and the fourth opening 310.

The first clamping block 206 can include a first through hole 312 configured to be aligned with the first recess 300 and to receive the first tube 128 when the fitting 130 is assembled. The first clamping block 206 can also include a second through hole 314 positioned to be aligned with the first opening 302 of the body 200 when the first through hole 312 is aligned with the first recess 300, and a third through hole 316 positioned to be aligned with the second opening 304 of the body 200 when the first through hole 312 is aligned with the first recess 300. The second clamping block 208 can include a fourth through hole 318 configured to be aligned with the second recess 306 and to receive the second tube 132 when the fitting 130 is assembled. The second clamping block 208 can also include a fifth through hole 320 positioned to be aligned with the third opening 308 of the body 200 when the fourth through hole 318 is aligned with the second recess 306, and a sixth through hole 322 positioned to be aligned with the fourth opening 310 of the body 200 when the fourth through hole 318 is aligned with the second recess 306.

As shown in FIG. 4, individually, the first clamping bolt 210, the second clamping bolt 212, the third clamping bolt 214, and the fourth clamping bolt 216 can include a head 324 and a shaft 326. In some other embodiments, counterparts of the body 200, the first and second flat regions 202, 204, and the first and second clamping blocks 206, 208 can be relatively large, and more than two bolts can be used to secure the counterpart clamping blocks to the counterpart body. For example, three or four bolts can be parallel to and circumferentially distributed around a counterpart of the first tube 128, and another three or four bolts can be parallel to and circumferentially distributed around a counterpart of the second tube 132. Other configurations of counterpart bolts and clamping blocks are also possible.

Figure 5:
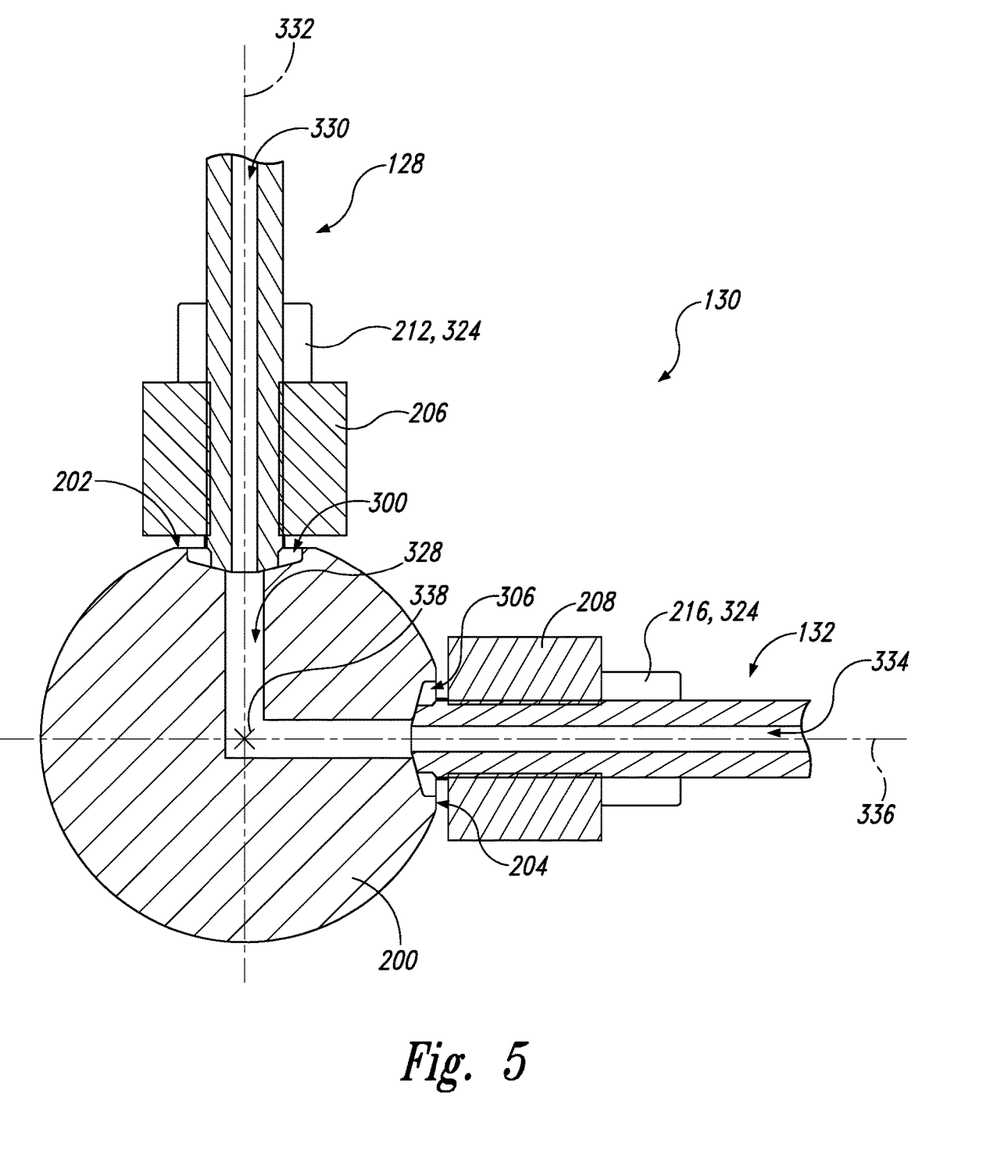
FIG. 5 is a cross-sectional view of the fitting and associated components of the waterjet system shown in FIG. 1 taken along the line 5-5 in FIG. 3.
Figure 6:
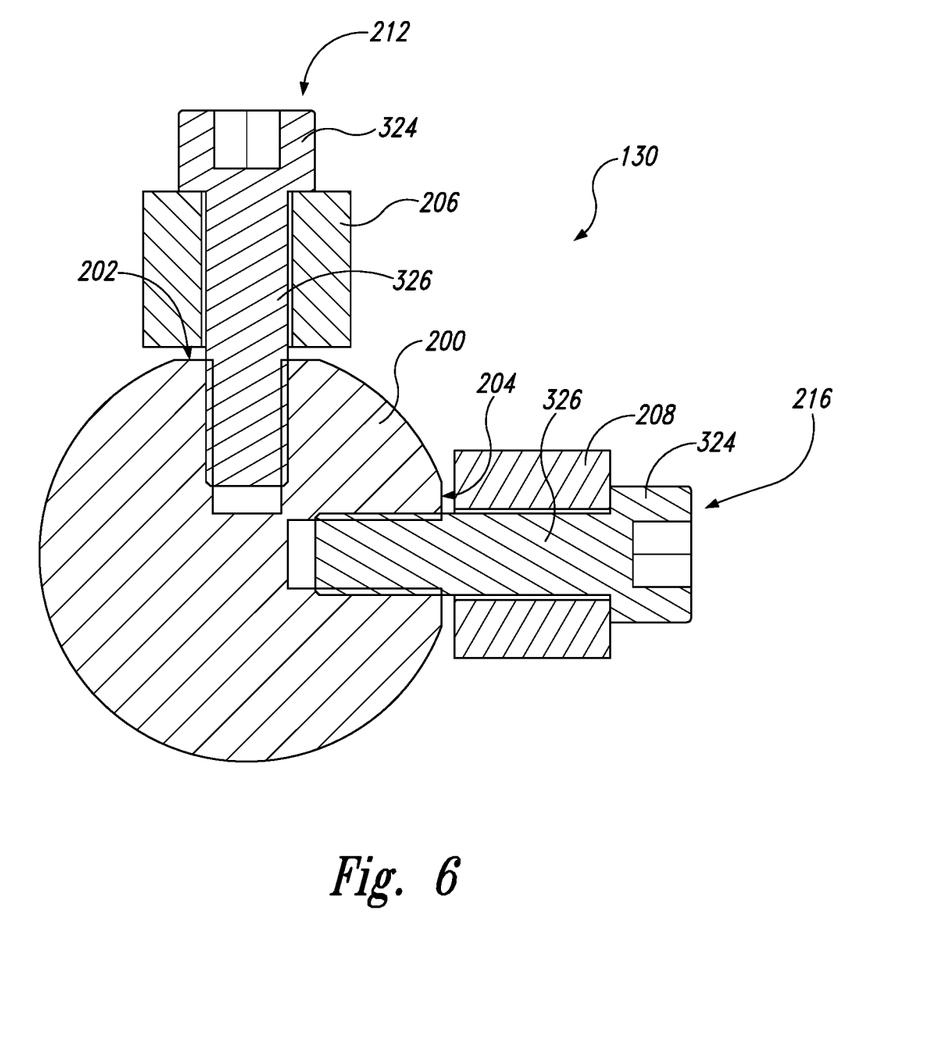
FIG. 6 is a cross-sectional view of the fitting and associated components of the waterjet system shown in FIG. 1 taken along the line 6-6 in FIG. 3.

FIGS. 5 and 6 are cross-sectional views of the fitting 130, the end portion of the first tube 128, and the end portion of the second tube 132 taken, respectively, along the lines 5-5 and 6-6 in FIG. 3. With reference to FIGS. 4-6 together, when the fitting 130 is assembled, the end portion of the first tube 128 and the end portion of the second tube 132 can extend, respectively, through the first through hole 312 (FIG. 4) of the first clamping block 206 and the fourth through hole 318 (FIG. 4) of the second clamping block 208. The first clamping block 206 and the second clamping block 208 can be configured to be bolted to the body 200 and thereby secure, respectively, the first tube 128 to the body 200 at the first recess 300 and the second tube 132 to the body 200 at the second recess 306. Respective shafts 326 of the first clamping bolt 210, the second clamping bolt 212, the third clamping bolt 214, and the fourth clamping bolt 216 can extend through, respectively, the second through hole 314, the third through hole 316, the fifth through hole 320, and the sixth through hole 322, and into, respectively, the first opening 302, the second opening 304, the third opening 308, and the fourth opening 310.

The end portion of the first tube 128, the end portion of the second tube 132, the first through hole 312 (FIG. 4), and the fourth through hole 318 (FIG. 4) can be at least partially threaded such that the first tube 128 and the second tube 132 can be secured by threaded engagement to the first clamping block 206 and the second clamping block 208, respectively. The shafts 326, the first opening 302, the second opening 304, the third opening 308, and the fourth opening 310 can also be at least partially threaded. Tightening the first clamping bolt 210 and the second clamping bolt 212 while the first tube 128 is secured to the first clamping block 206 can force the first tube 128 against the body 200. Similarly, tightening the third clamping bolt 214 and the fourth clamping bolt 216 while the second tube 132 is secured to the second clamping block 208 can force the second tube 132 against the body 200. In addition or instead of the other advantages described herein, the fitting 130 can be useful as an adaptor. For example, if first tube 128 is ¼" and needs to be replaced with a new tube that is ³⁄₁₆", the first clamping block 206 can simply be replaced with a similar clamping block in which a counterpart of the first through hole 312 matches the size and threading of the new tube.

With reference again to FIGS. 4-6, the body 200 can include a passage 328 extending inwardly from a first end portion at the first recess 300 in a first direction, and extending inwardly from an opposite second end portion at the second recess 306 in a second direction offset from the first direction by an angle, such as 90 degrees. The first tube 128 can include a bore 330 aligned with a length of the first end portion of the passage 328 along a first tube axis 332. Similarly, the second tube 132 can include a bore 334 aligned with a length of the second end portion of the passage 328 along a second tube axis 336. The second tube axis 336 can be offset from the first tube axis 332 by an angle within a range from 45 degrees to 180 degrees or another suitable angle. The body 200 can have a body axis 338 (shown as an "x" in FIG. 5) perpendicular to the first tube axis 332, the second tube axis 336, and respective lengths of the first opening 302, the second opening 304, the third opening 308, the fourth opening 310, the first through hole 312, the second through hole 314, the third through hole 316, the fourth through hole 318, the fifth through hole 320, and the sixth through hole 322. In at least some embodiments, the first tube 128 and the second tube 132 are relatively thick-walled. For example, the inner diameter can be at most 50% of the outer diameter for one or both of the first tube 128 and the second tube 132.

Figure 7:
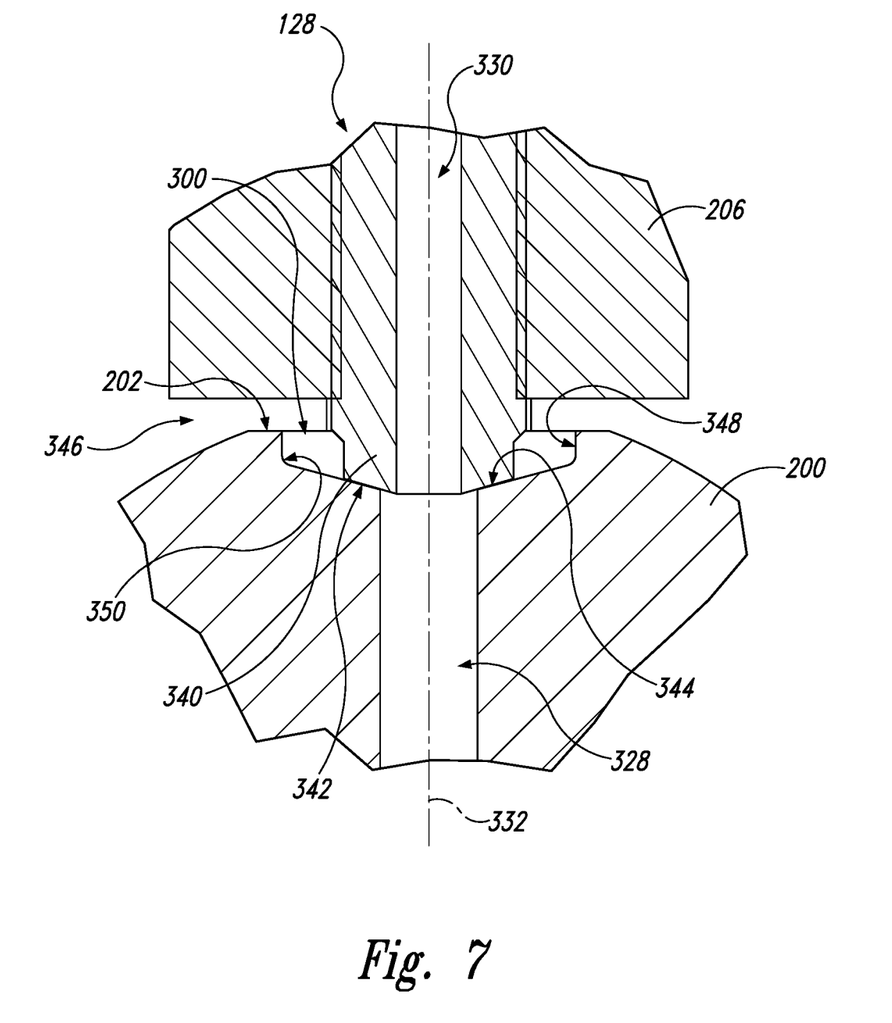
FIG. 7 is an enlarged view of a portion of FIG. 5.

FIG. 7 is an enlarged view of a portion of FIG. 5. As shown in FIG. 7, the end portion of the first tube 128 can include a tip 340 and a rim 342 within the first recess 300. The body 200 can include a sealing surface 344 within the first recess 300 that abuts the rim 342. The sealing surface 344 can extend around the first end portion of the passage 328 such that the first end portion of the passage 328 is aligned with the bore 330 of the first tube 128 when the rim 342 and the sealing surface 344 are in contact with one another. In at least some cases, an interface between the sealing surface 344 and the rim 342 tapers inwardly toward the first end portion of the passage 328 at an angle within a range from 65 to 85 degrees relative to the first tube axis 332. Relatedly, a cross section of the sealing surface 344 in the first plane of the first opening 302, the second opening 304, the first through hole 312, the second through hole 314, and the third through hole 316 can be at most 30 degrees off perpendicular to the length of the first through hole 312. Thus, the interface between the sealing surface 344 and the rim 342 can be closer to perpendicular to the first tube axis 332 than would be typical of a conventional collet fitting. Due to this difference and/or for other reasons, the fitting 130 may be less prone to misalignment and/or over-tightening than a conventional collet fitting. In addition or alternatively, the first tube 128 may impart relatively little tangential stress on the body 200, which may extend the fatigue life of the fitting 130.

With continued reference to FIG. 7, the first clamping block 206 can be spaced apart from the first flat region 202 and from the first recess 300 by a gap 346. At the first recess 300, the body 200 can include a sidewall 348 extending around the sealing surface 344, and an annular corner 350 at which the sidewall 348 meets the sealing surface 344. The sidewall 348 can be configured to direct any spray leakage from the interface between the sealing surface 344 and the rim 342 toward the first clamping block 206 rather than outward via the gap 346. In some cases, a cross section of the sidewall 348 in the first plane of the first opening 302, the second opening 304, the first through hole 312, the second through hole 314, and the third through hole 316 is at most 30 degrees off parallel to the length of the first through hole 312. In other cases, the sidewall 348 can have another suitable orientation relative to the length of the first through hole 312. It should be noted that the second recess 306 and the end portion of the second tube 132 can have features the same as or similar to the features of the first recess 300 and the end portion of the first tube 128 discussed with reference to FIG. 7.

Figure 8:
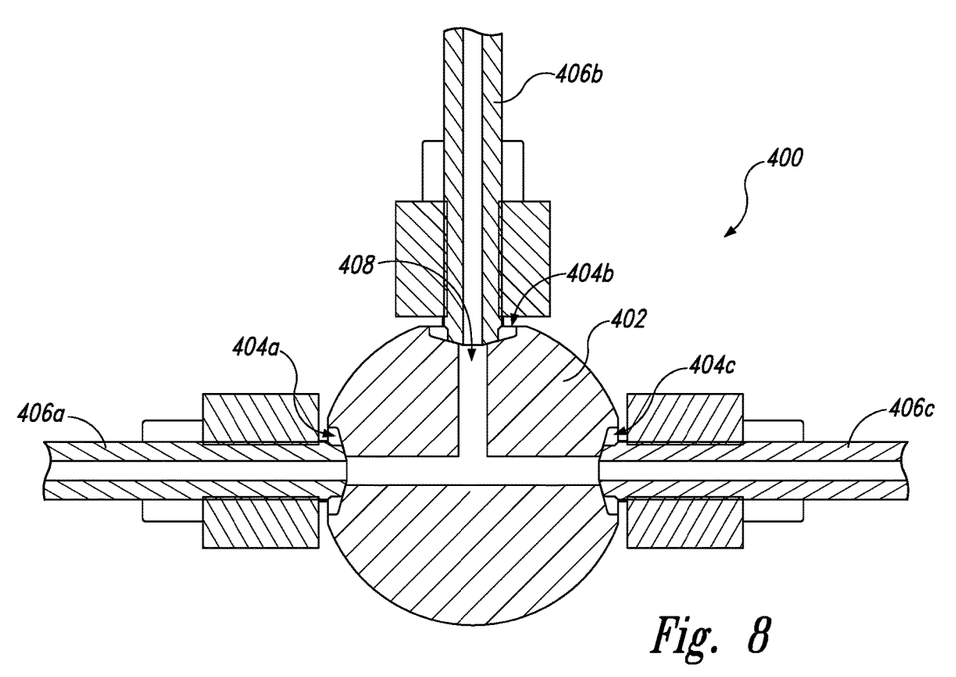
FIGS. 8 and 9 are cross-sectional views similar to FIG. 5, but showing other respective fittings and associated components in accordance with at least some embodiments of the present technology.
Figure 9:
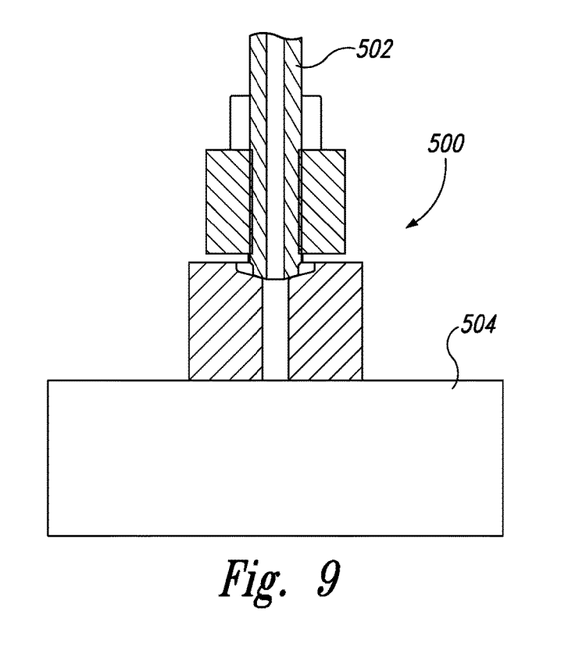

FIGS. 8 and 9 are cross-sectional views similar to FIG. 5, but showing other respective fittings and associated components in accordance with at least some embodiments of the present technology. In particular, as shown in FIG. 8, a fitting 400 can include a body 402 having three circumferentially spaced-apart recesses 404 (individually identified as recesses 404a-404c) at which the fitting 400 is connected, respectively, to end portions of three tubes 406 (individually identified as tubes 406a-406c). The fitting 400 also includes a T-shaped passage 408 extending between the recesses 404. In other embodiments, counterparts of the fitting 130 (FIG. 5) and the fitting 400 (FIG. 8) can have other suitable passage configurations, such as a two-way straight passage, a three-way Y-shaped passage, a four-way cross-shaped passage, etc. Furthermore, at least some aspects of the present technology are applicable to fittings that couple a tube to a component other than another tube. For example, as shown in FIG. 9, a fitting 500 can connect an end portion of a tube 502 to a non-tube component 504 (shown schematically). The non-tube component 504 can be a pump at a proximal end of an ultrahigh-pressure plumbing assembly, a cutting head at a distal end of an ultrahigh-pressure plumbing assembly, or another suitable component that benefits from a fluid connection to the tube 502.

Figure 10:
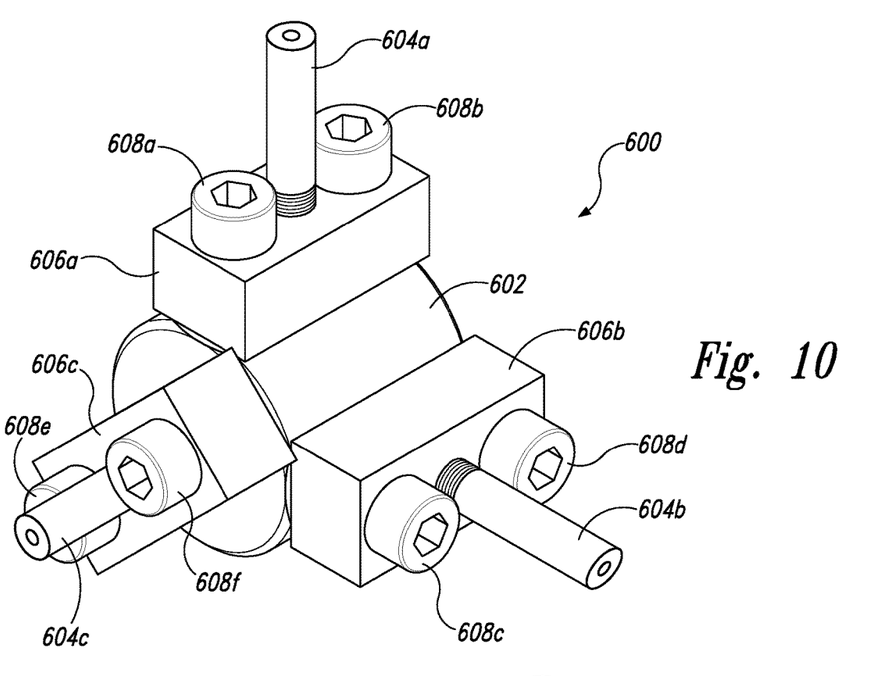
FIGS. 10 and 11 are perspective views of respective fittings and associated components in accordance with at least some embodiments of the present technology.

FIG. 10 is a perspective view of a fitting 600 and associated components in accordance with at least some embodiments of the present technology. The fitting 600 can include a body 602 that connects three tubes 604 (individually identified as tubes 604a-604c) in a non-planar arrangement. For example, the tubes 604a, 604b can be in a given plane, and the tube 604c can be in another plane perpendicular to the given plane. Within the body 602, the fitting 600 can include a passage (not shown) with respective legs axially aligned with the tubes 604a-604c. The fitting 600 can further include clamping blocks 606 (individually identified as clamping blocks 606a-606c) and clamping bolts 608 (individually identified as clamping bolts 608a-608f) through which the tubes 604a-604c are operably connected to the body 602 as discussed above in the context of the fitting 130 (FIG. 1-6). The tube 604a and the clamping bolts 608a, 608b can be in a first plane, the tube 604b and the clamping bolts 608c, 608d can be in a second plane, and the tube 604c and the clamping bolts 608e, 608f can be in a third plane radially between the first and second planes. This arrangement can reduce or eliminate interference between the clamping bolts 608 within the body 602. In other embodiments, a counterpart of the fitting 600 can include additional tubes interconnected via a counterpart of the body 602. For example, a counterpart of the fitting 600 can include tubes at opposite respect ends of a counterpart of the body 602 and two, three, four, or more tubes at spaced apart respective portions of the circumference of the counterpart of the body 602. Other three-dimensional arrangements of interconnected tubes are also possible.

Figure 11:
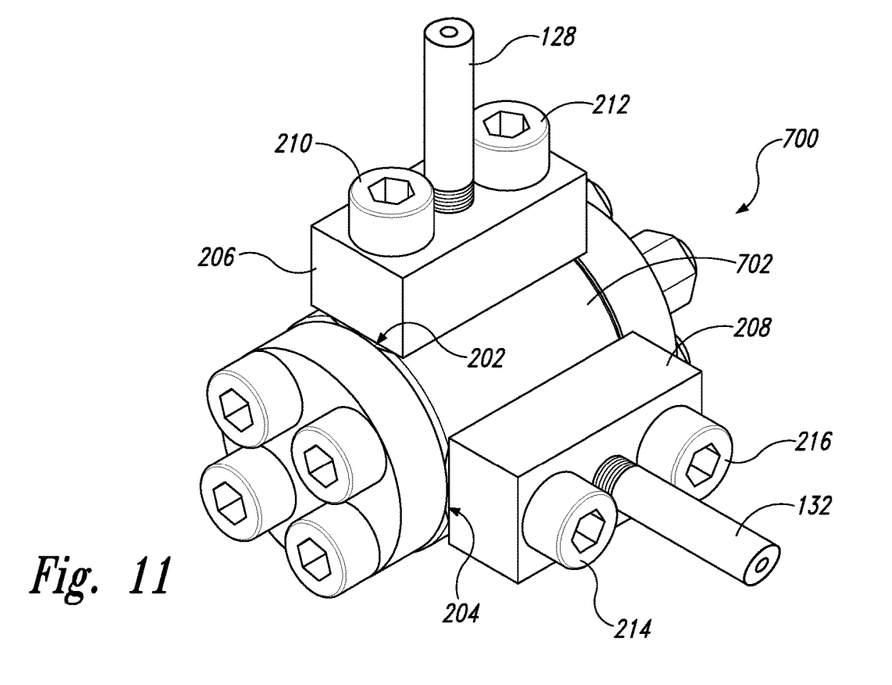

FIG. 11 is a perspective view of a fitting 700 and associated components in accordance with at least some embodiments of the present technology. The fitting 700 can a include a body 702 similar to the body 200 of the fitting 130 (FIG. 1-6), but also including through holes (not shown) perpendicular to the first tube 128 and the second tube 132. The fitting 700 can further include plates 704 (individually identified as plates 704a-704b) at opposite respective sides of the body 704, and compression bolts 706 (individually identified as compression bolts 706a-706d) extending through the plates 704 and the body 702 via the through holes in the body 702 and via corresponding through holes (not shown) in the plates 704. Tightening the compression bolts 706 can exert a compressing bias on the body 702, thereby improving the fatigue life of the body 702. Details of this concept, including other suitable bolt configurations for exerting a compression bias, can be found in U.S. Pat. No. 7,748,750, which is incorporated herein by reference in its entirety.

This disclosure is not intended to be exhaustive or to limit the present technology to the precise forms disclosed herein. Although specific embodiments are disclosed herein for illustrative purposes, various equivalent modifications are possible without deviating from the present technology, as those of ordinary skill in the relevant art will recognize. In some cases, well-known structures and functions have not been shown and/or described in detail to avoid unnecessarily obscuring the description of the embodiments of the present technology. Although steps of methods may be presented herein in a particular order, in alternative embodiments the steps may have another suitable order. Similarly, certain aspects of the present technology disclosed in the context of particular embodiments can be combined or eliminated in other embodiments. Furthermore, while advantages associated with certain embodiments may have been disclosed in the context of those embodiments, other embodiments may also exhibit such advantages, and not all embodiments need necessarily exhibit such advantages or other advantages disclosed herein to fall within the scope of the present technology.

Throughout this disclosure, the singular terms "a," "an," and "the" include plural referents unless the context clearly indicates otherwise. Similarly, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the terms "comprising" and the like may be used herein to mean including at least the recited feature(s) such that any greater number of the same feature(s) and/or one or more additional types of features are not precluded. Directional terms, such as "upper," "lower," "front," "back," "vertical," and "horizontal," may be used herein to express and clarify the relationship between various elements. It should be understood that such terms do not denote absolute orientation. Reference herein to "one embodiment," "an embodiment," or similar formulations means that a particular feature, structure, operation, or characteristic described in connection with the embodiment can be included in at least one embodiment of the present technology. Thus, the appearances of such phrases or formulations herein are not all referring to the same embodiment. Furthermore, various particular features, structures, operations, or characteristics may be combined in any suitable manner in one or more embodiments of the present technology.

We claim:

1. A plumbing fitting, comprising:
   a body including—
      a recess,
      a passage extending inwardly from the recess, wherein the passage has an end portion at the recess,
      a sealing surface within the recess and extending around the end portion of the passage,
      a sidewall within the recess and extending around the sealing surface,
      a first opening laterally spaced apart from the recess, and
      a second opening laterally spaced apart from the recess, wherein the recess is between the first opening and the second opening; and
   a clamping block including—
      a first through hole configured to receive a tube,
      a second through hole positioned to be aligned with the first opening when the first through hole is aligned with the recess, and
      a third through hole positioned to be aligned with the second opening when the first through hole is aligned with the recess,
   wherein the first opening, the second opening, and the first through hole are at least partially threaded.

2. The fitting of claim 1 wherein the fitting has a pressure rating from 10,000 psi to 150,000 psi.

3. The fitting of claim 1 wherein the sealing surface meets the sidewall at an annular corner within the recess.

4. The fitting of claim 1, further comprising:
   a first clamping bolt having a head and a shaft, wherein the shaft of the first clamping bolt is configured to extend through the second through hole and into the first opening; and
   a second clamping bolt having a head and a shaft, wherein the shaft of the second clamping bolt is configured to extend through the third through hole and into the second opening.

5. The fitting of claim 1 wherein, when the fitting is fully assembled, respective lengths of the first opening, the second opening, the first through hole, the second through hole, and the third through hole are in the same plane.

6. The fitting of claim 5 wherein, when the fitting is fully assembled, a cross section of the sidewall in the plane is at most 30 degrees off parallel to the length of the first through hole.

7. The fitting of claim 5 wherein, when the fitting is fully assembled, a cross section of the sealing surface in the plane is at most 30 degrees off perpendicular to the length of the first through hole.

8. The fitting of claim 1 wherein:
   the body is generally cylindrical; and
   when the fitting is fully assembled, the body has a body axis perpendicular to a length of the first through hole.

9. The fitting of claim 8 wherein:
   an outer surface of the body has a flat region extending around respective outermost portions of the recess, the first opening, and the second opening; and
   when the fitting is fully assembled, the flat region of the outer surface of the body is perpendicular to a length of the first through hole.

10. The fitting of claim 1 wherein:
    the recess, the end portion of the passage, the sealing surface, the sidewall, the clamping block, and the tube are a first recess, a first end portion of the passage, a first sealing surface, a first sidewall, a first clamping block, and a first tube respectively;
    the body includes—
       a second recess spaced apart from the first recess, wherein the passage extends inwardly from the second recess, and wherein the passage has a second end portion at the second recess,
       a second sealing surface within the second recess and extending around the second end portion of the passage,
       a second sidewall within the second recess and extending around the second sealing surface,
       a third opening laterally spaced apart from the second recess, and
       a fourth opening laterally spaced apart from the second recess, wherein the second recess is between the third opening and the fourth opening;
    the fitting further comprises a second clamping block including—
       a fourth through hole configured to receive a second tube,
       a fifth through hole positioned to be aligned with the third opening when the fourth through hole is aligned with the second recess, and
       a sixth through hole positioned to be aligned with the fourth opening when the fourth through hole is aligned with the second recess; and
    the third opening, the fourth opening, and the fourth through hole are at least partially threaded.

11. A plumbing connection, comprising:
    a first tube, wherein an inner diameter of the first tube is at most 50% of an outer diameter of the first tube, and wherein the first tube has an end portion including a rim;
    a second tube, wherein an inner diameter of the second tube is at most 50% of an outer diameter of the second tube, and wherein the second tube has an end portion including a rim; and
    a fitting fluidly connecting the first tube and the second tube to one another, wherein the fitting includes— a body including—
a first recess,
a second recess spaced apart from the first recess,
a passage having a first end portion at the first recess and a second end portion at the second recess,
a first sealing surface within the first recess and extending around the first end portion of the passage, wherein the first sealing surface abuts the rim of the first tube,
a second sealing surface within the second recess and extending around the second end portion of the passage, wherein the second sealing surface abuts the rim of the second tube,
a first sidewall within the first recess and extending around the first sealing surface, wherein the first sealing surface meets the first sidewall at an annular corner within the first recess, and
a second sidewall within the second recess and extending around the second sealing surface, wherein the second sealing surface meets the second sidewall at an annular corner within the second recess, and
a first clamping block securing the first tube to the body at the first recess, wherein the first clamping block is spaced apart from the first recess, and
a second clamping block securing the second tube to the body at the second recess, wherein the second clamping block is spaced apart from the second recess.

12. The connection of claim 11 wherein the connection has a pressure rating from 10,000 psi to 150,000 psi.

13. The connection of claim 11 wherein the first clamping block is configured to be bolted to the body, and wherein the second clamping block is configured to be bolted to the body.

14. The connection of claim 11 wherein:
the first tube includes a bore aligned with a length of the first end portion of the passage along a first tube axis;
the second tube includes a bore aligned with a length of the second end portion of the passage along a second tube axis offset from the first tube axis by an angle within a range from 45 degrees to 180 degrees;
an interface between the first sealing surface and the rim of the first tube tapers inwardly toward the first end portion of the passage at an angle within a range from 65 to 85 degrees relative to the first tube axis; and
an interface between the second sealing surface and the rim of the second tube tapers inwardly toward the second end portion of the passage at an angle within a range from 65 to 85 degrees relative to the second tube axis.

15. The connection of claim 11 wherein:
the first tube includes a bore aligned with a length of the first end portion of the passage along a first tube axis;
the second tube includes a bore aligned with a length of the second end portion of the passage along a second tube axis offset from the first tube axis by an angle within a range from 45 degrees to 180 degrees;
the body is generally cylindrical; and
the body has a body axis perpendicular to the first tube axis and perpendicular to the second tube axis.

16. The connection of claim 11 wherein:
the first sidewall is configured to direct spray leakage from an interface between first sealing surface and the rim of the first tube toward the first clamping block; and
the second sidewall is configured to direct spray leakage from an interface between second sealing surface and the rim of the second tube toward the second clamping block.

17. A waterjet system, comprising:
a pressurizing device configured to pressurize liquid to a pressure within a range from 10,000 psi to 120,000 psi;
a cutting head configured to direct a jet including the liquid toward a workpiece;
a tube downstream from the pressurizing device and upstream from the cutting head, wherein the cutting head receives the liquid from the pressurizing device via the tube, and wherein the tube has—
a bore, and
an end portion including a rim; and
a fitting at the end portion of the tube, wherein the fitting includes—
a body including—
a passage having an end portion, wherein the bore of the tube is aligned with a length of the end portion of the passage along a tube axis, and
a sealing surface extending around the end portion of the passage, wherein the sealing surface abuts the rim of the tube, and wherein an interface between the sealing surface and the rim of the tube tapers inwardly toward the end portion of the passage at an angle within a range from 65 to 85 degrees relative to the tube axis, and
a clamping block securing the tube to the body.

18. The waterjet system of claim 17 wherein:
the body includes a sidewall extending around the sealing surface; and
the sidewall is configured to direct spray leakage from the interface toward the clamping block.

19. The waterjet system of claim 17 wherein:
the body includes—
a first opening laterally spaced apart from the sealing surface, and
a second opening laterally spaced apart from the sealing surface, wherein the sealing surface is between the first opening and the second opening; and
the clamping block includes—
a first through hole, wherein the end portion of the tube extends through the first through hole,
a second through hole aligned with the first opening, and
a third through hole aligned with the second opening.

20. The waterjet system of claim 19 wherein the fitting further comprises:
a first clamping bolt having a head and a shaft, wherein the shaft of the first clamping bolt extends through the second through hole and into the first opening; and
a second clamping bolt having a head and a shaft, wherein the shaft of the second clamping bolt extends through the third through hole and into the second opening.

* * * * *